Figure 1:
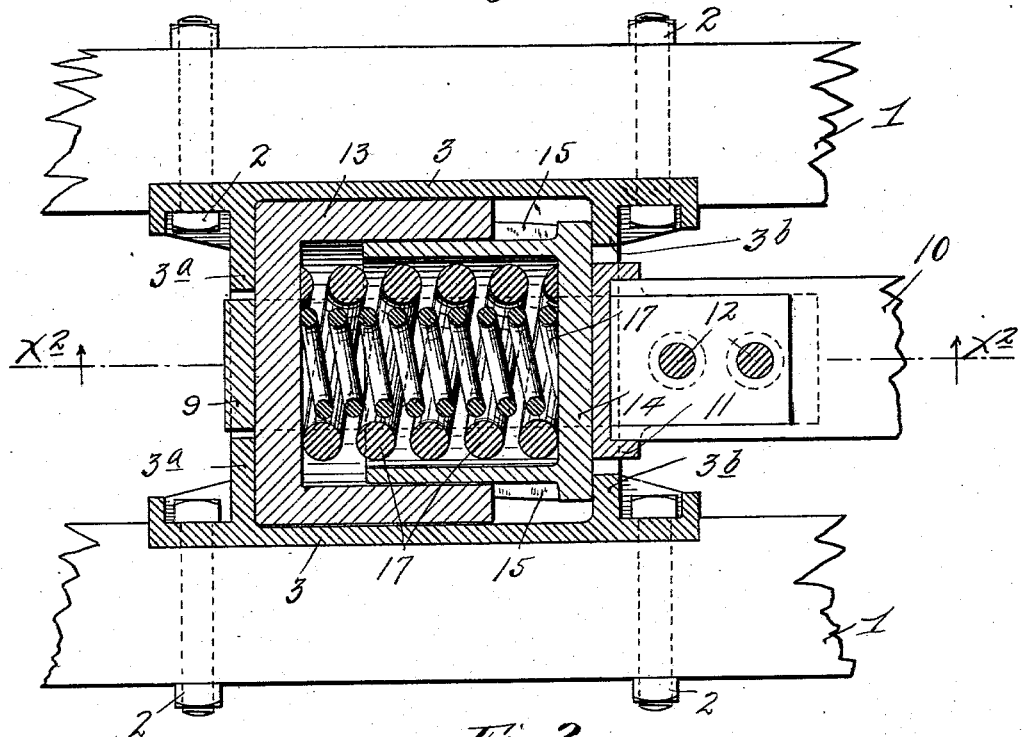

No. 753,454. PATENTED MAR. 1, 1904.
E. C. WASHBURN.
DRAFT RIGGING FOR CARS.
APPLICATION FILED JULY 25, 1902.
NO MODEL. 3 SHEETS—SHEET 1.

Witnesses,
H. D. Kilgore
A. H. Opsahl

Inventor
Edwin C. Washburn,
By his Attorneys,
Williamson & Merchant

No. 753,454. PATENTED MAR. 1, 1904.
E. C. WASHBURN.
DRAFT RIGGING FOR CARS.
APPLICATION FILED JULY 25, 1902.
NO MODEL. 3 SHEETS—SHEET 2.

Witnesses,
H. D. Kilgore
A. H. Opsahl

Inventor:
Edwin C. Washburn,
By his Attorneys,
Williamson Merchant

No. 753,454. PATENTED MAR. 1, 1904.
E. C. WASHBURN.
DRAFT RIGGING FOR CARS.
APPLICATION FILED JULY 25, 1902.
NO MODEL. 3 SHEETS—SHEET 3.

Witnesses.
H. D. Kilgore
A. H. Opsahl

Inventor.
Edwin C. Washburn.
By his Attorneys,
Williamson & Merchant

No. 753,454. Patented March 1, 1904.

UNITED STATES PATENT OFFICE.

EDWIN C. WASHBURN, OF MINNEAPOLIS, MINNESOTA.

DRAFT-RIGGING FOR CARS.

SPECIFICATION forming part of Letters Patent No. 753,454, dated March 1, 1904.

Application filed July 25, 1902. Serial No. 116,907. (No model.)

*To all whom it may concern:*

Be it known that I, EDWIN C. WASHBURN, a citizen of the United States, residing at Minneapolis, in the county of Hennepin and State of Minnesota, have invented certain new and useful Improvements in Draft-Rigging for Cars; and I do hereby declare the following to be a full, clear, and exact description of the invention, such as will enable others skilled in the art to which it appertains to make and use the same.

My present invention is especially directed to the improvement of draft-rigging for cars, engines, and tenders, but broadly has for its object to provide an improved frictional retarding device or check for tension and compression springs.

To the above ends the invention consists of the novel devices and combinations of devices hereinafter described, and defined in the claims.

The invention is illustrated in the accompanying drawings, wherein like characters indicate like parts throughout the several views.

In the drawings I have illustrated the improved spring device incorporated into a draft-rigging such as is common in ordinary railway use.

Figure 2:
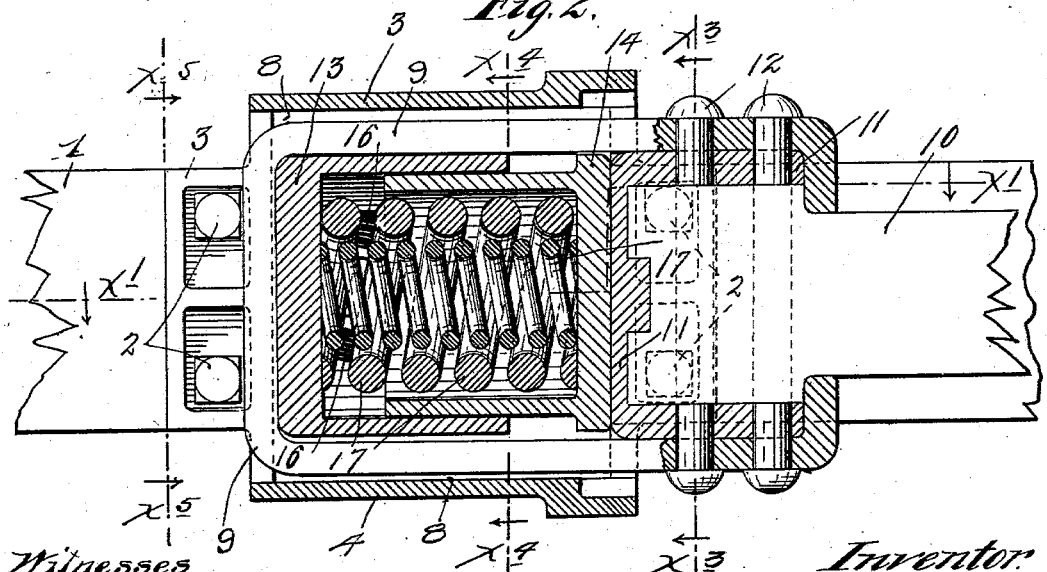
Figure 3:
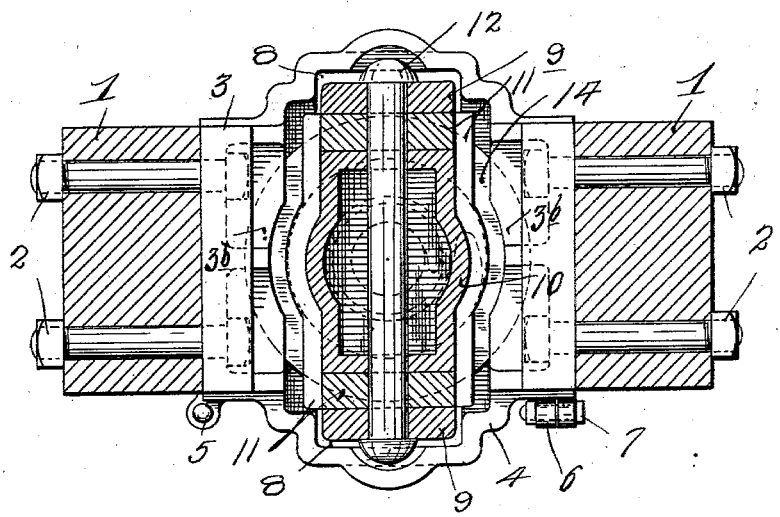
Figure 4:
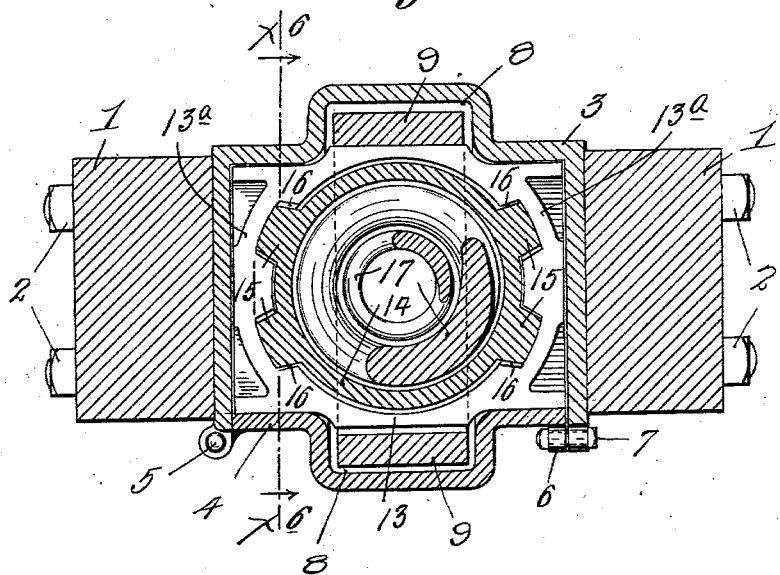
Figure 5:
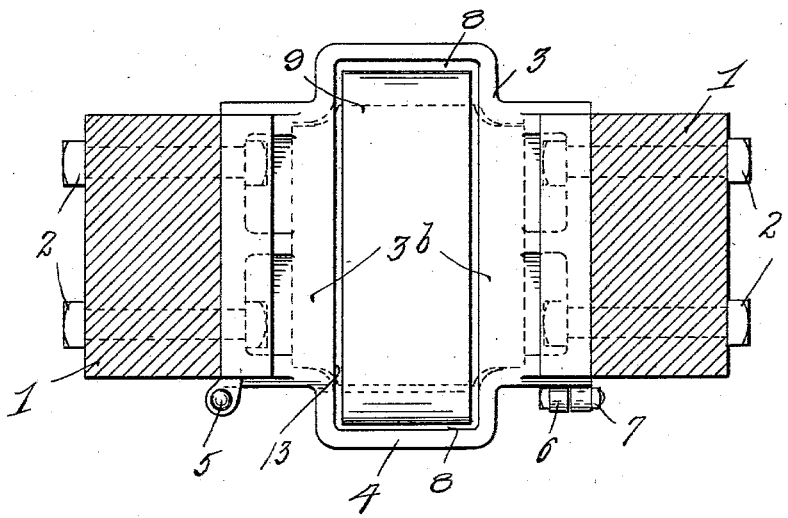
Figure 6:
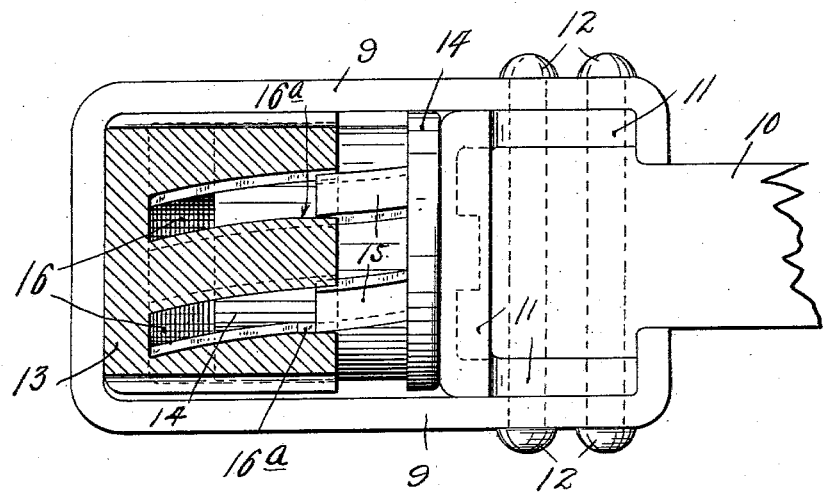

Figure 1 is a horizontal section on the line $x'\ x'$ of Fig. 2, illustrating a draft-rigging such as above indicated. Fig. 2 is a vertical section taken on the line $x^2\ x^2$ of Fig. 1, some parts being broken away. Fig. 3 is a transverse section on the line $x^3\ x^3$ of Fig. 2. Fig. 4 is a transverse section on the line $x^4\ x^4$ of Fig. 2. Fig. 5 is a transverse section on the line $x^5\ x^5$ of Fig. 2, and Fig. 6 is a longitudinal section taken on the line $x^6\ x^6$ of Fig. 4.

The numeral 1 indicates the draft-timbers of the car, to which is rigidly secured, by means of bolts 2, an approximately rectangular draft-box 3, the bottom 4 of which is hinged thereto at 5 and is adapted to be locked in working position by a stop 6, shown as detachably secured to one side of said box by short nutted bolt 7. The top of the box 3 and its bottom 4 are bulged, respectively, upward and downward to form longitudinal seats or channels in which work the upper and lower prongs of the yoke or stirrup 9 of the coupler 10. The end of the coupler draft-bar 10 is shown as faced by a cap 11, preferably of steel. This cap 11 has upper and lower prongs which are interposed between the head of the draft-bar 10 and the prongs of the yoke or stirrup 9. Heavy rivets 21 are passed through the said parts 9, 10, and 11, as best shown in Fig. 2, and rigidly hold the said parts together.

One of the spring-pressed members is non-rotary, and the coöperating member telescopes therewith and is free to rotate under the action of the screw engagement between the said two parts. The said non-rotary member 13 has projecting flanges $13^a$, which work within and closely fit the interior of the box 3. The member 14 is cup-shaped and telescopes into the member 13. The said members 13 and 14 have screw-threaded engagement, preferably afforded by a plurality of but slightly-twisted or spiral flanges or truncated threads 15 on said members 14, which work in correspondingly-formed grooves 16, cut in the non-rotary member 13, preferably as best shown in Figs. 4 and 6. For a purpose which will hereinafter appear the grooves 16 are cut straight at their forward ends, as best shown at $16^a$. The members 13 and 14 constitute followers and afford a spring-case.

The telescoping member 13 is embraced by and fits loosely within the stirrup or yoke 9, and its inward movement toward the left with respect to Figs. 1 and 2 is limited by abutments or thrust-flanges $3^a$, formed on the draft-box 3. The outer end of the rotary member 14 bears directly against the face of the cap 11 of the draft-bar 10, and its outward movement toward the right with respect to Figs. 1 and 2 is limited by the engagement therewith of abutments or thrust flanges or lugs $3^b$ on the draft-box 3.

The draft-spring 17 is compressed within the telescoping sections 13 and 14 and of course tends to separate the same as far as permitted by the draft-lugs $3^a$ and $3^b$ and by the yoke 9 and cap 11. The said spring 17 is what is usually termed a "single" spring, although it may be made up of several concentric coils.

The operation will be substantially as follows: Under bumping strains the telescope member 13 remains stationary, being driven against the draft-lugs 3ᵃ, and the coöperating member 14 will be forced inward or toward the left, and will thereby be caused to rotate under heavy friction against the face of the cap 11. This friction will of course tend to retard the compression of the spring, and hence will relieve the same from intense and sudden strains due to the bumping of the cars. Under draft strains the non-rotary member 13 will be drawn forward or toward the right, and the member 14, being held against movement toward the right by the draft-lugs 3ᵇ, will afford a base of reaction for the spring and will be caused to rotate under heavy frictional engagement with the draft-lugs 3ᵇ. In this way friction is brought into action to retard the compression of the spring under draft strains.

In some cases it will be desirable that the frictional retarding device be not thrown into action until after the spring has been given more or less initial compression. This may be readily accomplished by cutting straight for a short distance the outer end of the thread-grooves 16, as best shown at 16ᵃ at Fig. 6.

As is evident, the draft-bar, yoke, and spring devices may be quickly dropped from working position and out of the draft-box simply by releasing the hinged bottom 4 and turning the same downward and to one side.

I do not claim "the combination, with a draft-bar, its yoke, and spring devices, of a draft-box having its bottom hinged at one side and detachably secured at the other, substantially as described;" nor do I claim "the combination, with draft-sills, shouldered draft-plates affixed thereto, a draw-bar, a draw-bar yoke, buffer-springs, and follower-plates against which said springs bear and engaging at their ends the shoulders of the draft-plates, of a laterally-swinging frame or door, one side margin of which is hinged to swing laterally toward and from the draft-rigging and provided at its other side margin with parts of a locking device for holding the same in its uppermost position."

What I claim, and desire to secure by Letters Patent of the United States, is as follows:

1. A draft appliance involving a spring, casings between which said spring compresses, said casings serving as followers, and abutments against which said casings are pressed, substantially as described.

2. In a draft-rigging, the combination with a spring and a pair of spring-pressed followers, at least one of which followers is caused to rotate when moved toward or from the other, and abutments with which said followers engage and against at least one of which abutments the coöperating follower is rotated, substantially as described.

3. In a draft-rigging, the combination with a spring and a pair of spring-pressed followers incasing said spring, at least one having a rotary movement with respect to the other, and abutments against which said followers directly engage and against at least one of which the coöperating follower is rotated, substantially as described.

4. The combination with abutments, of a pair of telescoping spring-pressed followers having screw-threaded engagement, one with the other, said followers directly engaging said abutments and at least one thereof being rotatively movable against its coöperating abutment, substantially as described.

5. The combination with fixed abutments, of a pair of spring-pressed followers engaging said abutments, at least one of which followers is rotated when moved toward or from the other follower, and is rotated against its coöperating abutment, substantially as described.

6. The combination with a draft-box having abutments, of a pair of spring-pressed followers engaging said abutments, one of said followers being held against rotation, by said draft-box, and the other follower having a rotary movement against its coöperating abutment, substantially as described.

7. The combination with a draft-box having abutments, of a pair of telescoping spring-pressed followers having screw-threaded or cam engagements and engaging said coöperating abutments, one of said telescoping followers having projecting flanges which coöperate with the draft-box to prevent rotation thereof, the other casing-follower having a rotary movement against its coöperating abutments, substantially as described.

8. The combination with a pair of spring-pressed followers, one of which is fixed against rotation and the other of which is caused to rotate when the followers are moved toward or from each other, of a relatively fixed abutment with which said rotary follower engages, substantially as described.

9. The combination with a draft-box and a draft-bar having a yoke which works through said draft-box, of a pair of spring-pressed followers compressed between said yoke and draft-bar and coöperating with abutments on the said draft-box, one of the said followers being held by said draft-box against rotation, and means for causing the other follower to rotate against the coöperating abutment, when the abutments are moved toward and from each other, substantially as described.

10. The combination with a draft-box and a draft-bar having a yoke working through said draft-box, of a pair of spring-pressed cup-shaped followers having screw-threaded engagement, which followers are pressed one against said draft-bar and the other against said yoke, the one thereof being held against rotation by said draft-box, and the other being mounted to rotate against its coöperating abutment, substantially as described.

11. A draft-bar having a yoke, and a metallic facing covering the inner end of the same and having flanges interposed between said draft-bar and said yoke, substantially as described.

12. A draft-bar having at its inner end a shouldered head, a metallic facing embracing said shouldered head, and a yoke embracing the side flanges of said facing, secured to the said head and facing and having inturned ends that engage the outer shoulders of said head, substantially as described.

13. A draft-box having abutments or draft-lugs located inward of its extremities and having bolt-passages in its extremities outward of said abutments, substantially as described.

14. The combination with a draft-bar and a yoke, of a pair of spring-pressed telescoping followers having screw-threaded engagement, one of said followers being mounted to rotate against said draft-bar and the other having a rectangular flange, and a draft-box having a rectangular interior coöperating with the rectangular flange of the non-rotary follower, and provided with upper and lower wall-channels for passing and guiding said yoke, substantially as described.

15. In a friction draft-gear, the combination of two followers having at their ends interlocking spiral bearings, and a spring in each follower adapted to be compressed between the outer end of one follower and the inner end of the other follower.

In testimony whereof I affix my signature in presence of two witnesses.

EDWIN C. WASHBURN.

Witnesses:
ELIZABETH H. KELIHER,
F. D. MERCHANT.